March 12, 1968
Z. V. GIANETTI
3,372,637
DELIVERY MECHANISM
Filed June 27, 1966
6 Sheets-Sheet 4
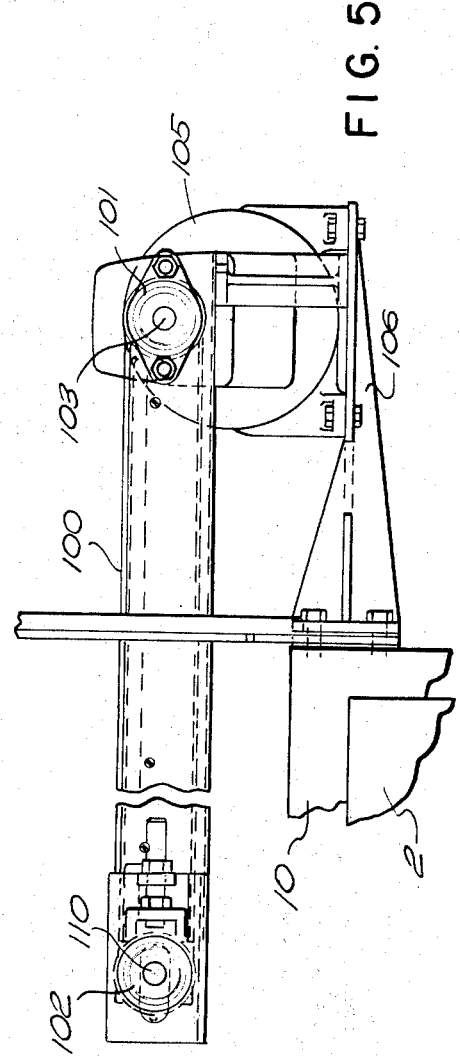
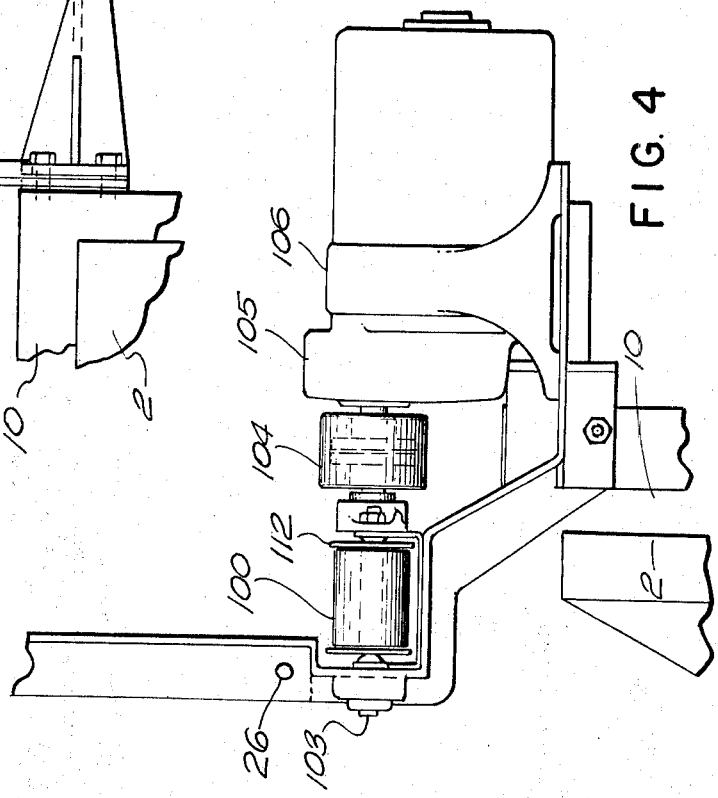
INVENTOR.
Zeffro V. Gianetti
BY
Wolf, Greenfield & Hieken
ATTORNEYS

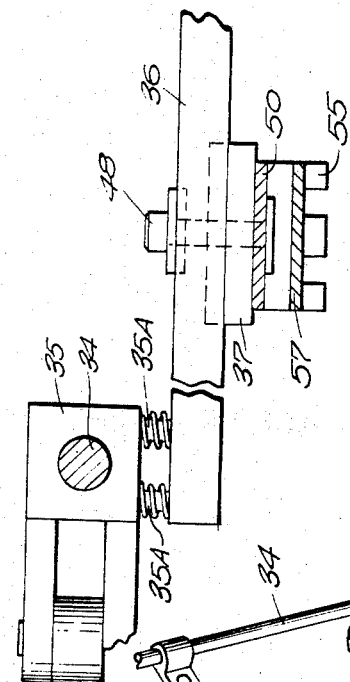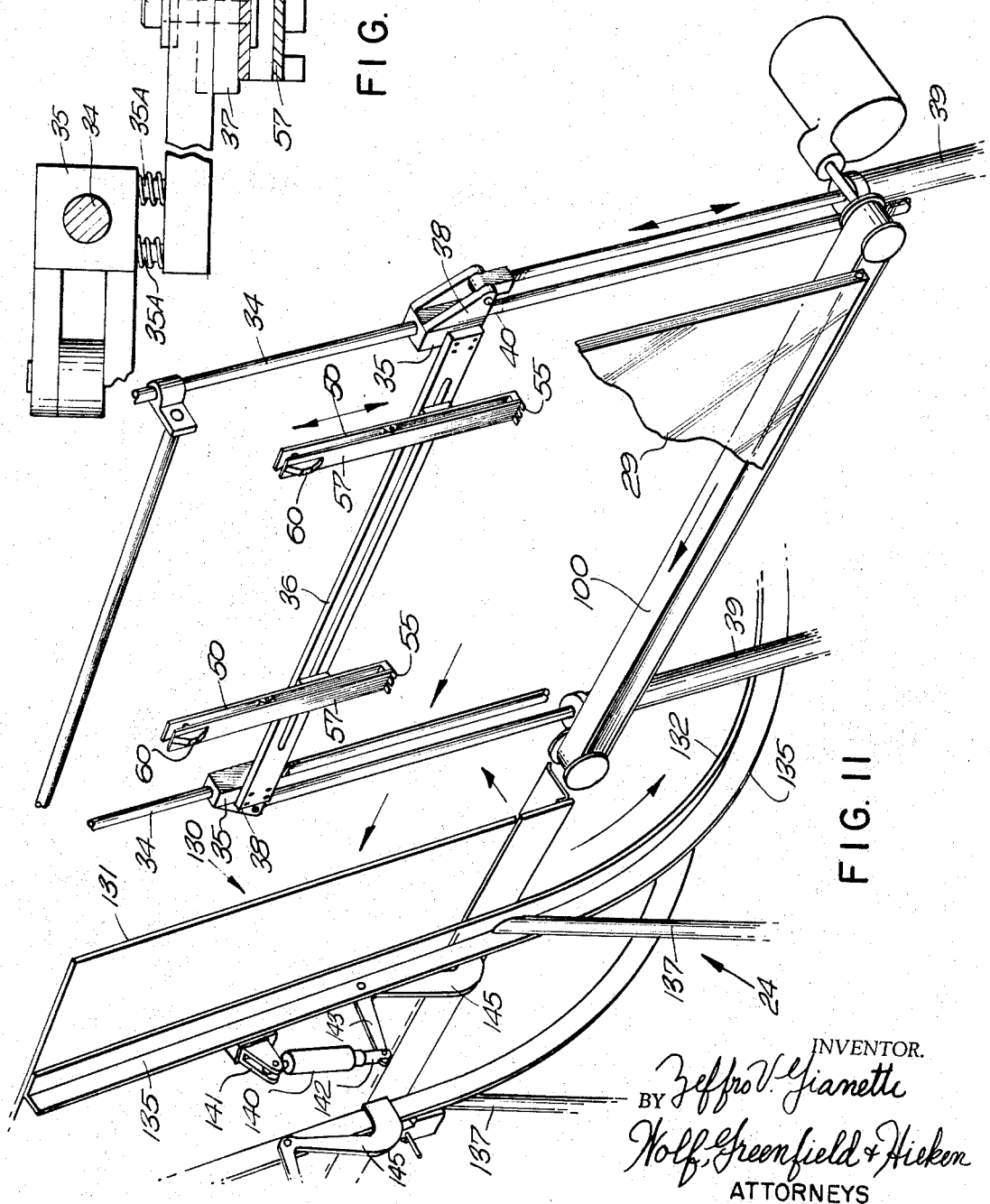

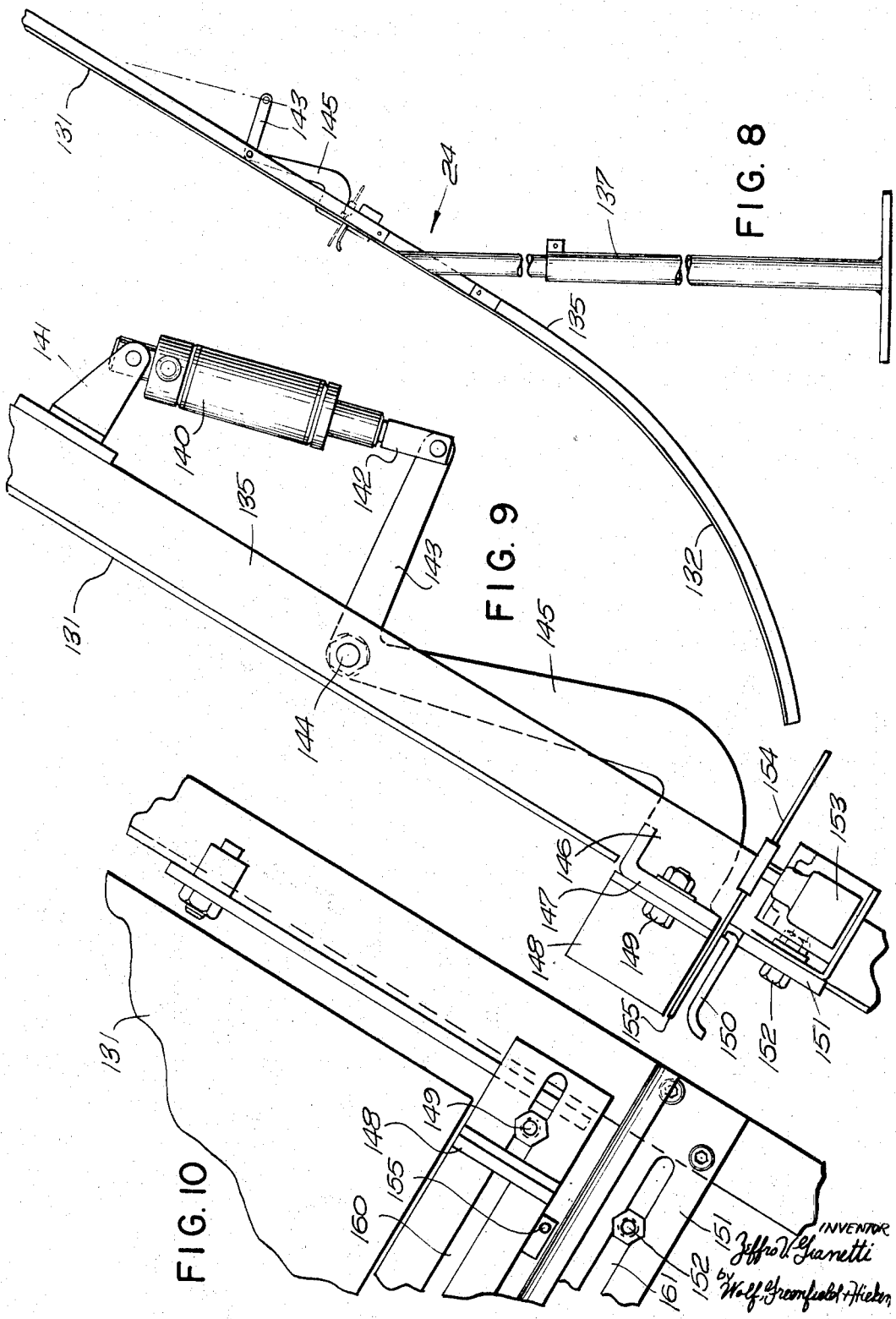

United States Patent Office 3,372,637
Patented Mar. 12, 1968

3,372,637
DELIVERY MECHANISM
Zeffro V. Gianetti, Franklin, Mass., assignor to Thomson National Press Company, Inc., Franklin, Mass., a corporation of Massachusetts
Filed June 27, 1966, Ser. No. 560,611
10 Claims. (Cl. 100—218)

ABSTRACT OF THE DISCLOSURE

A delivery mechanism for removing die-cut cardboard sheets from a platen press having a fixed platen extending upwardly and a movable platen adapted to be moved in pressing relation with the fixed platen. Impaling elements carried by a frame project between the platens when they are closed. When the platens open, the sheet is moved upwardly by the impaling means to a position in which the lower edge of the sheet is engaged by a laterally moving conveyor. This laterally moving conveyor moves the processed sheet from the press to a chute-like arrangement which permits the processed sheet to slide downwardly for further handling.

---

The present invention relates to a means for automatic removal of processed sheet material from a cutting, embossing and creasing platen press or like machinery.

Many styles of cutting and creasing presses, such for example as those made by the Thomson National Press Company, Inc., of Franklin, Mass., are designed to cut or crease successively fed sheet material. Many of these machines are designed to emboss, cut and crease very large sheets of material such, for example, as is used in fabricating corrugated and solid containers. In operating such machines the operator commonly manually feeds in and removes the sheet after it has been processed. Such operations require a great deal of skill and energy in an operator, especially when large sheets are being rapidly processed. In addition, many operators of these machines insert and remove sheets with a continuous motion such that both hands of the operator may be in the machine at one time.

It is an object of the present invention ot provide a cutting and creasing platen press having means for automatically removing processed sheet material. It is also an object of the present invention to provide a means which increases the efficiency of a cutting and creasing press and reduces the likelihood that the operator will become fatigued and thereby less productive.

In the present invention there is provided a delivery mechanism or means for removing processed sheet material from a cutting and creasing press having a fixed platen or anvil extending upwardly and a movable platen adapted to be moved into pressing relation with the fixed platen. Engaging means are adapted to engage sheet material as it is being processed between the platens, and after processing, upwardly remove the sheet material from between the platens. Means are provided for disengaging the sheet material from the engaging means and moving the processed sheet in a second direction angular to the first direction of movement to a delivery means.

These and other objects and advantages of the present invention will be more clearly understood when considered in conjunction with the accompanying drawings in which:

FIG. 4 is a fragmentary detail of a portion of the press as illustrated in FIG. 1, with portions omitted for clarity;

FIG. 5 is a fragmentary view of the detail of FIG. 4 looking from the left;

FIG. 6 is a side view corresponding to that of FIG. 2 showing in detail one of the engaging elements;

FIG. 7 is a plan view of the engaging element shown in FIG. 6 and looking from the left side thereof;

FIG. 7A is a cross-section taken on the line 7A—7A of FIG. 6;

FIG. 8 is a side elevational view of the delivery mechanism;

FIG. 9 is an enlarged, fragmentary detail of the delivery mechanism;

FIG. 10 is a plan view of the detail shown in FIG. 9; and

FIG. 11 is a fragmentary, somewhat schematic perspective view of the invention, looking from the left of FIG. 1.

Figure 1:
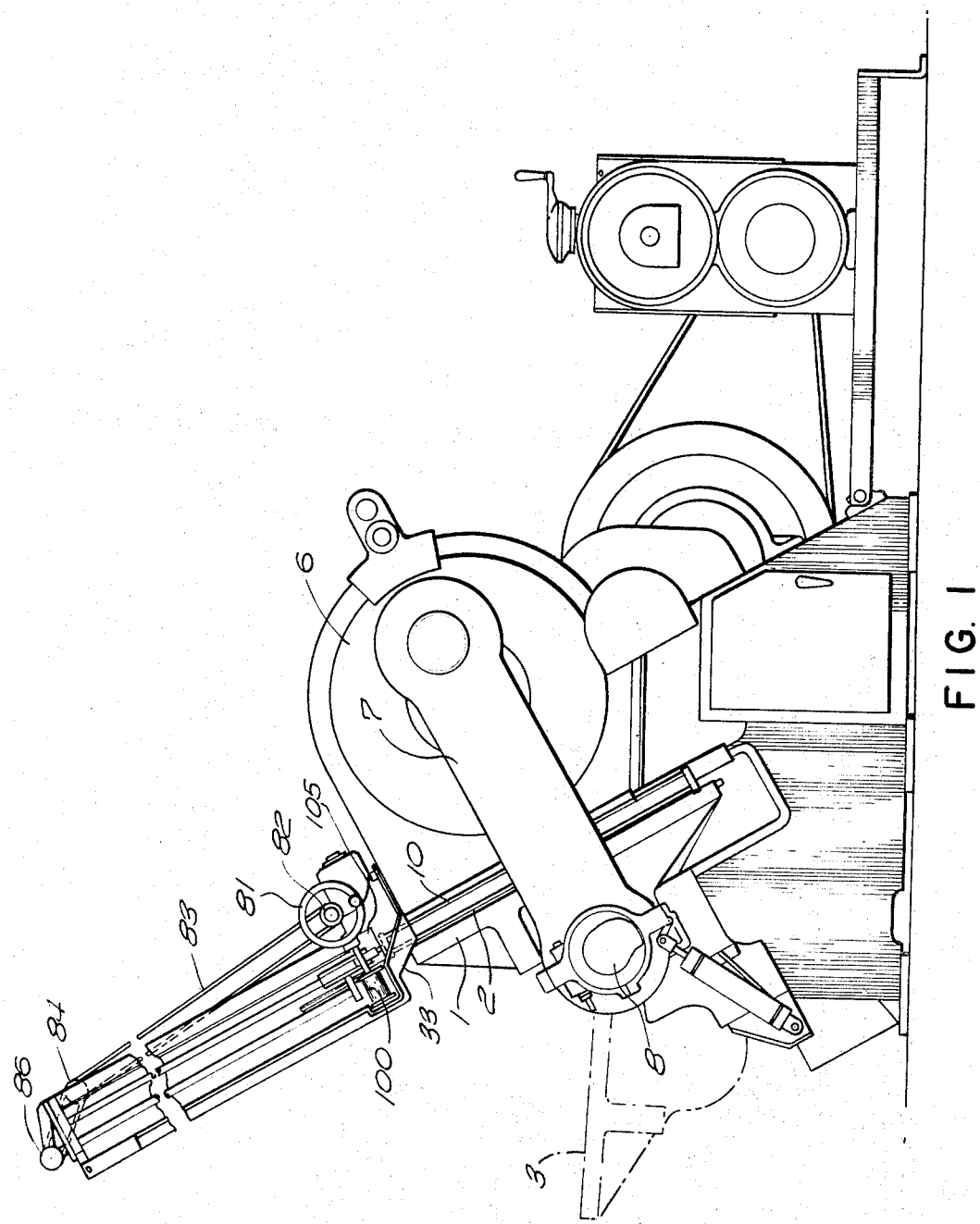
FIG. 1 is an elevational view of a platen press embodying the present invention.

This invention may be used for a wide variety of cutting and creasing presses but is particularly designed for use with platen presses having fixed and movable platens with the fixed platen extending angularly upwardly. For purposes of description, however, the invention will be described in connection with a preferred embodiment used in conjunction with the C–66 Style 10–8–7 AC–DM Press made by the Thomson National Press Company, Inc. of Franklin, Mass. This press has a net weight of 28,000 pounds; stands approximately 98 inches high; and has an impression speed per hour of between 520 and 1,560 impressions. The press is provided with a bridge 1 having a movable platen 2. The bridge is carried between an open position shown in dotted outline in FIG. 1 at 3, and a closed cutting and creasing position, as illustrated in solid outline, by means of a suitable operating mechanism. This operating mechanism includes a pair of main gears 6 suitably mounted at opposite sides of the machine for rotation by a suitable drive mechanism (not part of the invention). These gears 6 are each connected to the bridge 1 for reciprocal movement of the bridge by a connecting rod 7 suitably secured in an eccentric position at one end to the gear 6 and at the other suitably journaling the bridge shaft 8. A second or fixed platen 10, to which cutting or creasing dies may be fixed, is secured to the frame of the press with its surface facing the surface of platen 2 on bridge 1 when bridge 1 is in a cutting position. The surface of platen 10 preferably extends angularly upwardly from a horizontal, as illustrated in FIG. 1. Other means and components not forming a part of this invention are provided in this press for its operation in a known fashion.

The mechanism of the present invention includes elevator means generally indicated at 20 which are adapted to raise and lower a carriage means 21 which in turn carry a plurality of engaging means 22. The engaging means are adapted to reciprocate from a position at least partially between the opposed platens 2 and 10 when in a closed position whereby the engaging means may be secured to the sheet material being processed, to a position upwardly of the machine in which the engaged sheet material is drawn from between the platens 2 and 10 as the platens move apart. Also provided is a conveyor means 23 for carrying the processed sheet material laterally from the machine once the sheet has been removed from between the platens by the engaging means 22. The sheet material is carried by the conveying means 23 to a delivery system 24, FIGS. 8 to 10, which is laterally positioned with respect to the press and which includes a chute down which the processed sheet material is adapted to slide.

Figure 2:
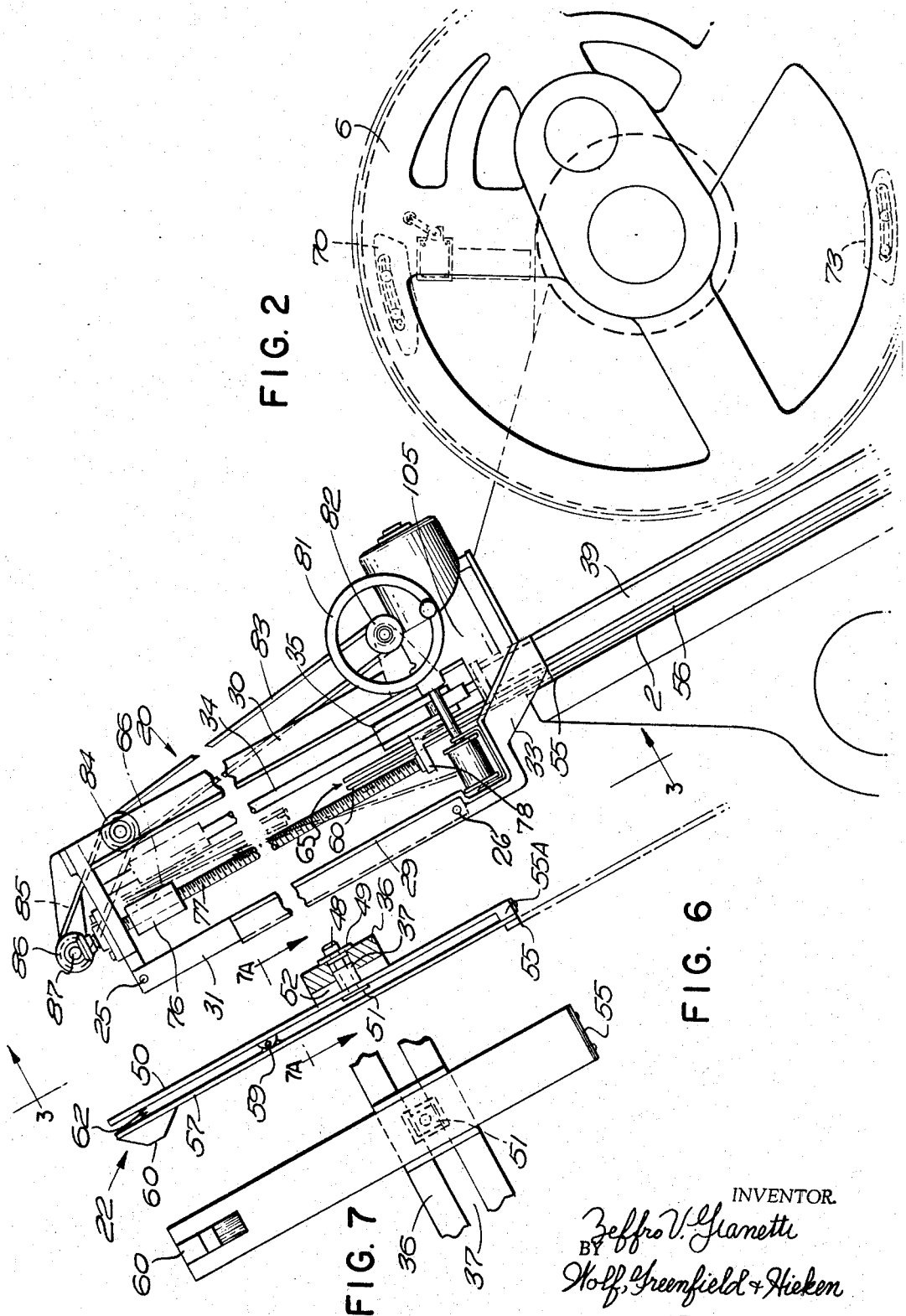
FIG. 2 is an enlarged, fragmentary side view taken from the same side of FIG. 1 illustrating further details of the invention.
Figure 3:
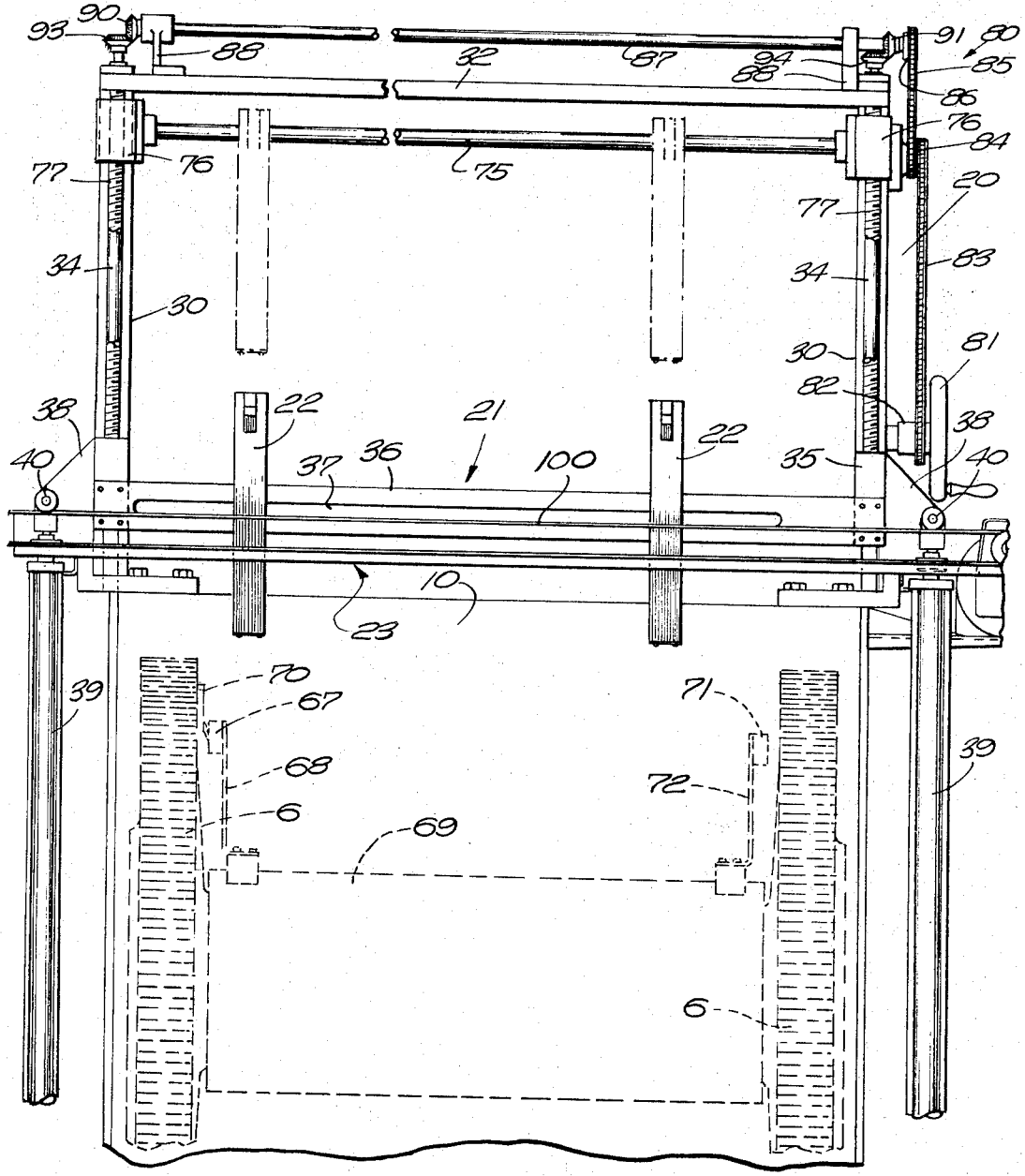
FIG. 3 is a fragmentary elevational view of the machine taken substantially along the line 3—3 of FIG. 2.

The elevator means 20, best illustrated in FIGS. 2 and 3, includes a plurality of elongated, T-shaped, cross-sectioned frame members 30. These frame members 30 extend angularly upwardly in planes parallel to the planar surface of fixed platen 10 at either end of the press. The frame members 30 are longer than the overall height of sheets which can be processed between the platens 2 and 10. The lower end of these frame members 30 are suitably secured by welding or otherwise to the frame of the press so as to rigidly support the frame members in the position illustrated. Cross braces 32 are rigidly secured by welding or otherwise at one end one to each of the tops of frame members 30. A second set of frame members 31 are positioned parallel to the first set 30, and are pivotally interconnected to them at their upper ends by cross braces 32, with the upper ends of each frame member 31 pivotally engaged to a brace 32 by a pin 25. The lower ends of the frame members 31 are each also suitably secured to angle brace 33 of the frame of the press by a removable pin 26. A sheet 29 preferably of transparent plastic extends across and is supported by the parallel frame members 31. This sheet 29 provides an inner guide surface against which the sheet material being processed may incline as it is being carried by the conveyor system 23 to the delivery means 24. The frame members 30 and 31 provide a rigid means for supporting the elevator means 20. Extending vertically between each of the frame members 30 and 31 are a pair of guide rods 34 which extend parallel to one another and to the frame members in a plane closer to frame member 30 than 31. These guide rods 34 are suitably anchored at their upper ends in the cross braces 32 and at their lower ends in cross brace 33 or an extension thereof. These guide rods support carriage means 21 for reciprocal movement. The carriage means 21 include a pair of sleeves 35 each slideably mounted on a rod 34 and carrying between them a bridge member 36 which comprises an elongated bar having an elongated slot 37. The bridge member 36 may be secured to each sleeve 35 by a plurality of pins or bolts 35A on which member 36 may move over a limited distance to and away from the sleeve 35. The bridge however is tensioned away from the sleeve by helical compression springs 35A positioned coaxially on the pins between the bridge and sleeve. This arrangement functions to keep the engaging means 22 in engagement with the processed sheet material when it is being pushed from such dies as may have been mounted on platen 10. Extending outwardly of each of the sleeves 35 is a flange element 38. A pair of air cylinders 39 are positioned and suitably secured one on each side of the press. The lower ends of the air cylinders are connected to a dual valve arrangement for moving the piston of the air cylinder up and down in a manner hereafter described. The upper end of the air cylinder is suitably secured to the frame of the press with the piston of the air cylinder pivotally linked by link 40 to the flange 38. Thus simultaneous actuation of the air cylinders 39 will cause up or down movement of the carriage means 21.

Adjustably secured to the carriage means 21 are the engaging means 22. The engaging means 22 are designed to engage a sheet of material being processed while the sheet of material is between the platens 2 and 10, and after engagement with the sheet material these engaging means are designed to lift the sheet material free as platens 2 and 10 are opened. These engaging means are best illustrated in FIGS. 6 and 7. An elongated support 50 is secured intermediate its ends to the bridge member 36, by a bolt 51 which extends through a hole in the elongated support 50, spacer 52, and the elongated slot 37. The bolt 51 is secured at its threaded end by a nut 48 and washer 49. The engaging means 22 may be adjusted laterally along the bridging member 36 for use with a variety of different sized sheet materials which are being processed. The lower end of the elongated support 50 is formed with an enlarged shoulder section 55A to which is secured the knife member 55 by suitable means such as screws. The knife member projects from the surface of the elongated support 50 a length sufficient to pierce sheet material 56 which is being processed. The length of this projection, however, should be equal to the space between platens 2 and 10 when the platens are closed. A stripper bar 57 is supported lengthwise of and adjacent to the elongated support 50. The stripper bar 57 is pivotally interengaged with the elongated support 50 at a point above the place of attachment of the engaging means 22 with the bridging member 36. This interengagement may be provided by a simple dog-ear hinge or other suitable hinging arrangement 59. The upper end of the stripper bar 57 is provided with a boss or detent 60 that projects from that surface of the stripper bar 57 which faces away from the elongated support 50. The lower end of the stripper bar 57 is positioned immediately above the upper surface of knife member 55 and is adapted to be pivoted from a position between the outer edge of the knife member 55 and the facing surface of elongated support 50 to a position beyond the outer edge of the knife member 55 so as to force any impaled sheet material from knife member 55. The thickness of bar 57 thus must be significantly less than the projecting depth of knife member 55. The stripper bar is tensioned by a spring 62 positioned between the facing surfaces of the stripper bar 57 and elongated support 50 at their upper ends so that the lower end of the stripper bar 57 is urged towards the adjacent shoulder 55A of the elongated support 50.

The engaging means 22 are each carried by the bridging member 36 for reciprocal motion parallel to the guide rods 34 from a low position in which the knife member 55 is positioned between the platens 2 and 10 when in a closed position (as illustrated at 65 in FIG. 2), to an up position (as illustrated at 66 in FIG. 2). This reciprocal movement is effected by simultaneous actuation of the air cylinders 39.

The simultaneous actuation of the air cylinders 39 is effected by a conventional solenoid control valve system (not shown). One set of valves controlled by the air cylinders 39 cause the pistons of the air cylinders 39 to move upwardly while the other set of valves controlled by a second set of solenoids cause the pistons of the air cylinders 39 to move downwardly. The upstroke of the air cylinder 39 pistons is actuated by a solenoid controlled by switch 67 (FIG. 3). This switch 67 is supported on a bracket 68 in turn secured to fixed shaft 69 about which gears 6 rotate. Switch 67 is adapted to engage trip cam 70 which is adjustably mounted on the left-hand gear as viewed in FIG. 3 of the pair of gears 6. The downstroke solenoids are controlled by switch 71 which is mounted on bracket 72 in turn secured to the shaft 69. Switch 71 is engaged by a trip cam 73 which is adjustably secured to the inner surface of the right gear 6 (shown in FIG. 2 but not in FIG. 3).

The bosses 60 on the upper end of the engaging means 22 are adapted to be engaged by cam shaft 75 (FIG. 3). The cam shaft 75 is supported at its ends by collars 76. Collars 76 in turn are threadingly supported on threaded shafts 77. Shafts 77 in turn are secured one each between frame members 30 and 31. The upper ends of each of these shafts 77 are journaled for rotation in the cross braces 32 while the lower ends of these shafts 77 are journaled for rotation in flanges 78, in turn secured to the frame of the machine. The shafts 77 are adapted to be simultaneously rotated for reciprocal vertical movement of the sleeves 76 so as to adjust the vertical location of the cam shaft 75. Rotation of the shafts 77 is achieved by the hand-adjusting mechanism 80 (FIG. 3). This hand-adjusting mechanism 80 includes a hand wheel 81, suitably journaled for rotation on the frame. This hand wheel 81 has coaxially mounted and fixed to it a sprocket 82 which engages the endless chain 83. A double sprocket 84 journaled for rotation near the upper end of one frame member 30, has one-half engaging the chain 83 and its other half engaging chain 85. Chain 85 in turn engages sprocket 86 which is coaxially mounted on shaft 87. Shaft 87 in turn is journaled for rotation in the journals 88 which are supported on the cross brace 32. The shaft 87 is provided with gears 90 and 91 which respectively intermesh with gears 93 and 94. Gear 93 in turn is coaxially fixed to the upper end of one shaft 77 while gear 94 is coaxially fixed to the upper end of the other shaft 77. Thus shafts 77 are rotated simultaneously by rotation of shaft 87, which in turn is rotated in either direction through the chains 83 and 85 by the hand wheel 81. Rotation of shafts 77 will carry cam shaft 75 vertically in the frame for location at any select height dependent on the height of the sheet material 56 being processed. Bosses 60 engage the cam shaft 75 when the engaging means 22 are carried upwardly, thus pivoting the stripper bars 57 about hinge 59. This in turn causes the lower end of the stripper bar 57 to move away from the elongated support 50, thereby stripping from the knife member 55 any sheet material which may have been impaled on the knife member 55 on closure of the platens.

The conveyor means 23 includes an elongated conveyor belt 100. The conveyor belt is supported for rotation at the extreme ends of the machine by rolls 101 and 102 (FIGS. 4 and 5). Drive roll 101 in turn is supported on shaft 103. Shaft 103 in turn is journaled for rotation in the frame of the machine and is interengaged through a flexible coupling 104 with the drive motor 105. The drive motor 105 is in turn supported on the frame of the machine by a bracket 106. Roll 102 is mounted on shaft 110 in turn journaled for rotation on the side of the press opposite the side on which roll 101 is secured. The upper surface of belt 100 is positioned preferably normal to the surface of platen 10. As will be observed in FIG. 4, the inner edge 112 of the upper surface of belt 100 is displaced laterally from the plane in which the surface of platen 10 lies. This displacement provides a space between the inner edge 112 and the surface of platen 10 for vertical movement of the engaging means 22 between the inner edge 112 and the platen 10. Sheet material 56 engaged by the engaging means 22 is drawn upwardly between the plane in which the surface of platen 10 lies and the inner edge 112 of the belt 100.

The delivery means 24 comprises primarily a chute 130 positioned adjacent the machine (FIGS. 8 to 11). The upper end of the chute 130 includes a flat sheet 131 inclined at an angle parallel to and preferably longitudinally aligned with the plastic sheet 29 so as to form a continuous bearing surface with the sheet 29. The lower end of the chute 130 comprises an arcuately curved sheet 132 continuous with sheet 131. Sheets 131 and 132 are supported to form a chute 130 by framework 135 which includes a plurality of end supports and lateral supports suitably secured by stanchions 137 or the like. A guideway 150 having a downwardly outer lip is secured to the bottom of sheet 131 in longitudinal alignment with the upper surface of the belt 100 to receive and form a continuous support surface for processed sheets moved laterally on belt 100. Such processed sheets are moved onto the chute 130 to a position at which the leading edge of the processed sheet engages the projecting end 155 of contact arm 154 which in turn actuates switch 153. Switch 153 is suitably secured on the rear side of the chute 130 by a bracket which is in turn secured to the elongated slotted bar 151 by nut and bolt means 152 extending through slot 161. Such attachment means permits longitudinal adjustment of switch 153 for sheets of different sizes, the projecting end 155 of the arm 154 projects through an elongated lateral slot in chute 130.

Also projecting through the lateral slot in the chute is a stop 148. This stop is positioned to limit lateral movement of processed sheets carried onto guideway 150 by belt 100. The stop 148 is secured to punch bar 147 by nut and bolt means 149. The punch bar 147 is an elongated member with an elongated slot 160 through which the nut and bolt means 149 extends for adjustably locating stop 148. This punch bar is normally located in a slot in the chute above guideway 150 with the surface of the punch bar substantially aligned with the surface of the chute as illustrated in FIG. 9. The punch bar, however, is adapted to be moved toward the flared lip of guideway 150 to force the lower edge of any processed sheet material on the guideway off and thus allow it to fall down the lower end of chute 130. This action is controlled by an air cylinder 140 pivotally secured at its upper end to hinge support 141. The piston of the air cyinder 140 is secured to a shaft 142, in turn pivotally linked to a lever arm having legs 143, 145 and 146 continuous with and angular to one another. Legs 143 and 146 are substantially parallel with leg 145 interconnecting them at an acute angle to leg 143. The lever arm is pivoted to the framework 135 at hinge 144. The punch bar 147 is suitably connected to leg 146.

Air cylinder 140 is controlled by switch 153 through a suitable valve. Actuation of switch 153 causes downward movement of the piston of air cylinder 140 thereby pivoting the lever about pivot point 144 to cause the punch bar 147 to move outwardly toward the flared lip of guideway 150.

In the overall operation of this mechanism, the operator places a sheet of material to be processed on the platen 2 when it is in horizontal position 3. The platen 2 is then carried by the bridge 1 into cutting and creasing contact with such dies as may have been previously secured to platen 10. At this point, the engaging means 22 are located in a down position with the knife members 55 projecting toward platen 2. The pressure of platen 2 forces the sheet material onto the dies and at the same time impales the sheet material on knife members 55. When the platen 2 then cyclically opens, the sheet material 56 is forced from the dies by the conventional resilient material used on such dies but it remains on the knife members. The engaging means at this time start to move upwardly (on engagement of cam 70 with switch 67), carrying the processed sheet material upwardly from the machine. When the material 56 has been carried high enough, its lower edge will under the influence of gravity pivot onto the upper surface of belt 100. At about the same time the engaging means are tripped by cam shaft 75 thus forcing the sheet material from the knife members 55 and freeing it for movement on the continuously moving belt 100. The belt 100 projects the sheet material onto and over the full length of guideway 150 until it engages switch arm 154 and is stopped by stop 148. This in turn actuates air cylinder 140 causing the processed sheet material 56 to be projected over guideway 150 and down the chute 130. In the meanwhile the engaging arms have been moved downwardly between the now fully open platens 2 and 10 upon engagement of cam 73 with switch 71, thereby rendering the machine ready to receive the next sheet.

What is claimed is:

1. A delivery mechanism for removing processed sheet material from a platen press having a fixed platen extending upwardly and a movable platen adapted to be moved into pressing relation with said fixed platen comprising, engaging means for engaging a processed sheet in said press, means operatively associated with said engaging means for moving said engaging means and said processed sheet upwardly of said machine in a first direction, means for disengaging said engaging means from said processed sheet when said processed sheet has moved from said platens, and means for moving said processed sheet in a second direction angular to said first direction when said processed sheet has moved from said platens.

2. A delivery mechanism as set forth in claim 1 wherein said means operatively associated with said engaging means comprises a frame extending upwardly at an angle to the vertical, and carriage means supported on said frame for movement upwardly at said angle to the vertical, said carriage means supporting said engaging means.

3. A delivery mechanism as set forth in claim 2 wherein said means for moving said processed sheet in a second direction comprises means for engaging an edge of said processed sheet when it has moved above said platens for moving said processed sheet laterally with respect to said first direction of movement.

4. A delivery mechanism as set forth in claim 3 having means for moving said processed sheet in a third direction after said sheet has moved in said second direction.

5. A delivery mechanism as set forth in claim 4 wherein said means for moving said sheet in said third direction includes a chute positioned beside said platen press, means for guiding said sheet onto said chute as it moves in said second direction, means for supporting said sheet at an elevated position as it moves onto said chute, and means for releasing said sheet from said supporting means when it has moved onto said chute whereby said sheet may slide downwardly of said chute.

6. A delivery mechanism as set forth in claim 3 wherein said means for engaging an edge of said processed sheet comprises a conveyor belt having a conveying surface positioned above and extending transversely of said fixed platen, said belt also positioned within the angle formed by said platens when in an open position.

7. A delivery mechanism as set forth in claim 6 including elements adapted to be projected between said platens when closed whereby said sheet may be impaled upon and thereby engaged by said elements as said sheet is processed.

8. A delivery mechanism as set forth in claim 7 including a stripper element for removing said sheet impaled on said elements, and means positioned above said platens for actuating said stripper element on movement of said sheet above said platens.

9. A delivery mechanism as set forth in claim 8 including means for adjustably positioning said means for actuating said stripper element at selected distances from said fixed platen.

10. In a delivery mechanism for removing processed material from a platen press having a pair of platens adapted to move to and from a closed position in which the surfaces of said platens are positioned in parallel, closely spaced relation, an engaging means for engaging said material as it is processed between said platens including a knife member adapted to be positioned between said platens and having said material impaled thereon as said platens are moved to a closed position, means for moving said engaging means with said material impaled thereon whereby said material is carried from between said platens, and means for thereafter removing said material from said engaging means.

References Cited
UNITED STATES PATENTS

| | | | |
|---|---|---|---|
| 2,161,712 | 6/1939 | Krell | 271—84 |
| 2,901,127 | 8/1959 | Hazel | 214—1 |

BILLY J. WILHITE, *Primary Examiner.*